(12) United States Patent
Kim et al.

(10) Patent No.: US 11,190,605 B2
(45) Date of Patent: Nov. 30, 2021

(54) METHOD AND APPARATUS FOR CONNECTING DEVICES

(71) Applicant: Samsung Electronics Co., Ltd., Gyeonggi-do (KR)

(72) Inventors: Kwang-Min Kim, Seongnam-si (KR); Jong-Chang Lee, Suwon-si (KR); Won-Joo Park, Suwon-si (KR); Hyun-Sik Shim, Yongin-si (KR); Young-Hee Park, Seoul (KR); Moon-Sang Lee, Yongin-si (KR); Min-Soo Koo, Seoul (KR); Seung-Hyun Yoon, Anyang-si (KR); Ji-In Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 15/653,231

(22) Filed: Jul. 18, 2017

(65) Prior Publication Data

US 2017/0318106 A1 Nov. 2, 2017

Related U.S. Application Data

(63) Continuation of application No. 13/452,766, filed on Apr. 20, 2012, now abandoned.

(30) Foreign Application Priority Data

Apr. 21, 2011 (KR) .................. 10-2011-0037351

(51) Int. Cl.
*H04L 29/08* (2006.01)
*H04L 12/28* (2006.01)

(52) U.S. Cl.
CPC ............ *H04L 67/24* (2013.01); *H04L 67/025* (2013.01); *H04L 12/2825* (2013.01)

(58) Field of Classification Search
CPC .... H04L 67/24; H04L 67/025; H04L 12/2825
USPC ......................................................... 709/208
See application file for complete search history.

(56) References Cited

U.S. PATENT DOCUMENTS

| 7,376,723 | B2 | 5/2008 | Cho et al. |
| 7,483,964 | B1 | 1/2009 | Jackson et al. |
| 7,730,082 | B2 | 6/2010 | Sah et al. |
| 8,090,477 | B1* | 1/2012 | Steinberg ........... G05D 23/1905 |
| | | | 700/278 |
| 2002/0161885 | A1 | 10/2002 | Childers et al. |

(Continued)

FOREIGN PATENT DOCUMENTS

| EP | 1947571 | 7/2008 |
| JP | 2004-15169 A | 1/2004 |

(Continued)

OTHER PUBLICATIONS

Communication from a foreign patent office in a counterpart foreign application, KIPO, "Notice of Final Rejection," Application No. KR 10-2011-0037351, dated May 17, 2018, 8 pages.

(Continued)

*Primary Examiner* — Tonia L Dollinger
*Assistant Examiner* — Schquita D Goodwin

(57) ABSTRACT

A system and method for connecting devices includes receiving from a first device a request to follow a second device, and setting a following relationship between the first device and the second device in response to the request.

2 Claims, 6 Drawing Sheets

(56) References Cited

U.S. PATENT DOCUMENTS

| | | | |
|---|---|---|---|
| 2003/0079000 A1 | 4/2003 | Chamberlain | |
| 2003/0217136 A1 | 11/2003 | Cho | |
| 2004/0010561 A1 | 1/2004 | Kim et al. | |
| 2004/0047298 A1 | 3/2004 | Yook et al. | |
| 2004/0064585 A1 | 4/2004 | Doss | |
| 2006/0150142 A1* | 7/2006 | Yamamoto | H04L 12/2803 717/106 |
| 2006/0259982 A1 | 11/2006 | Upendran | |
| 2007/0150616 A1* | 6/2007 | Baek | H04L 12/2803 709/246 |
| 2007/0156256 A1* | 7/2007 | Jung | G05B 15/02 700/19 |
| 2007/0156447 A1 | 7/2007 | Kim | |
| 2007/0247307 A1 | 10/2007 | Riep | |
| 2008/0034078 A1 | 2/2008 | Sano et al. | |
| 2008/0064395 A1* | 3/2008 | Sibileau | G08C 17/02 455/433 |
| 2008/0125887 A1 | 5/2008 | Case | |
| 2008/0155476 A1 | 6/2008 | Forbes et al. | |
| 2008/0209034 A1* | 8/2008 | Shin | H04L 12/2825 709/224 |
| 2008/0282182 A1* | 11/2008 | Oosaka | H04L 12/2803 715/772 |
| 2009/0037832 A1 | 2/2009 | Falchuk et al. | |
| 2009/0043885 A1* | 2/2009 | John | G05B 23/0283 709/224 |
| 2009/0098907 A1* | 4/2009 | Huntzicker | G01C 21/12 455/556.1 |
| 2009/0125614 A1 | 5/2009 | Yamada | |
| 2010/0036941 A1* | 2/2010 | Rahman | H04L 12/2827 709/224 |
| 2010/0073201 A1* | 3/2010 | Holcomb | G08G 1/005 340/990 |
| 2010/0075673 A1* | 3/2010 | Colbert | H04L 67/24 455/435.1 |
| 2010/0082174 A1* | 4/2010 | Weaver | H04L 12/2827 700/295 |
| 2010/0085214 A1* | 4/2010 | Kim | G08G 1/14 340/932.2 |
| 2010/0093366 A1 | 4/2010 | Lee et al. | |
| 2010/0114488 A1* | 5/2010 | Khamharn | B60R 25/102 701/300 |
| 2010/0151879 A1 | 6/2010 | Morrill et al. | |
| 2010/0241716 A1 | 9/2010 | Akadiri | |
| 2010/0286801 A1* | 11/2010 | Yum | H04L 12/2809 700/90 |
| 2010/0318293 A1* | 12/2010 | Brush | G01C 21/165 701/431 |
| 2011/0040785 A1* | 2/2011 | Steenberg | G05B 23/0235 707/769 |
| 2011/0043367 A1* | 2/2011 | Becker | H04B 3/548 340/577 |
| 2011/0046798 A1* | 2/2011 | Imes | F24F 11/63 700/286 |
| 2011/0046805 A1* | 2/2011 | Bedros | H04L 12/2809 700/291 |
| 2011/0166701 A1 | 7/2011 | Thacher | |
| 2011/0202189 A1* | 8/2011 | Venkatakrishnan | G06Q 50/06 700/286 |
| 2011/0202910 A1* | 8/2011 | Venkatakrishnan | G06Q 10/06 717/171 |
| 2011/0211813 A1* | 9/2011 | Marks | G06Q 30/02 386/297 |
| 2012/0023212 A1* | 1/2012 | Roth | H04W 8/005 709/223 |
| 2012/0053746 A1 | 3/2012 | Drake | |
| 2012/0182939 A1* | 7/2012 | Rajan | A61B 5/0022 370/328 |
| 2012/0191052 A1* | 7/2012 | Rao | A61M 5/1723 604/290 |
| 2012/0259470 A1 | 10/2012 | Nijhawan | |
| 2013/0307702 A1* | 11/2013 | Pal | A47L 15/0047 340/870.02 |
| 2014/0058806 A1* | 2/2014 | Guenette | G05B 15/02 705/14.1 |

FOREIGN PATENT DOCUMENTS

| | | |
|---|---|---|
| JP | 2004015169 A | 1/2004 |
| JP | 4547927 | 7/2010 |
| KR | 20030089126 | 11/2003 |
| KR | 20030090374 | 11/2003 |
| KR | 20060076839 | 7/2006 |
| KR | 20090016745 | 2/2009 |
| KR | 10-0953826 | 4/2010 |
| KR | 20100132163 | 12/2010 |
| WO | 9959309 | 11/1999 |
| WO | 2012/113460 | 8/2012 |

OTHER PUBLICATIONS

Communication from a foreign patent office in a counterpart foreign application, KIPO, "Notice of Final Rejection," Application No. KR 10-2011-0037351, dated Jul. 2, 2018, 5 pages.
Office Action dated Dec. 12, 2017 in connection with Korean patent Application No. 10-2011-0037351.
Communication pursuant to Article 94(3) EPC dated Nov. 2, 2017 in connection with European Patent Application No. 12 162 473.8.
Foreign Communication from Related Counterpart Application, European Patent Application No. 12162473.8, Extended European Search Report dated Aug. 14, 2012, 6 pages.
Foreign Communication from Related Counterpart Application, PCT Patent Application No. PCT/KR2012/002609, International Search Report dated Oct. 30, 2012, 5 pages.
Foreign Communication from Related Counterpart Application, PCT Patent Application No. PCT/KR2012/002609, Written Opinion of the International Searching Authority dated Oct. 30, 2012, 5 pages.
Foreign Communication from Related Counterpart Application, European Patent Application No. 12162473.8, European Examination Report dated Apr. 5, 2016, 5 pages.
Donald J. Patterson, "An Ecosystem for Learning and Using Sensor-Driven IM Status Messages", 2009, IEEE CS, pp. 42-48.
Swarup Chandra, "Estimating Twitter User Location Using Social Interactions—A Content Based Approach", 2011, IEEE Computer Society, pp. 838-843.
Office Action dated Jun. 13, 2017 in connection with Korean Patent Application No. 10-2011-0037351.
European Patent Office, "Communication pursuant to Article 94(3) EPC," Application No. EP12162473.8, dated Nov. 23, 2018, 6 pages.

* cited by examiner

METHOD AND APPARATUS FOR CONNECTING DEVICES

CROSS-REFERENCE TO RELATED APPLICATION(S) AND CLAIM OF PRIORITY

The present application is a continuation of U.S. patent application Ser. No. 13/452,766 filed Apr. 20, 2012, and is related to and claims the benefit of Korean Patent Application No. 10-2011-0037351, filed on Apr. 21, 2011, in the Korean Intellectual Property Office, the disclosure of each of which is incorporated herein in its entirety by reference.

TECHNICAL FIELD OF THE INVENTION

The present invention relates to a method and apparatus for connecting devices, and more particularly, to a method and apparatus for connecting devices for setting a following relationship between the devices, and receiving a message about an event occurring in a followee device and transmitting the message to a follower device.

BACKGROUND OF THE INVENTION

Connections and data exchanges between devices are performed to copy or reproduce contents such as images, video, audio, and documents. For connecting devices, a device corresponding to a source and a device corresponding to a destination are to be predetermined in order to transfer data or messages there-between.

SUMMARY OF THE INVENTION

To address the above-discussed deficiencies of the prior art, it is a primary object to provide a method and apparatus for connecting devices, in which a following relationship is set between the devices, for receiving a message about an event occurring in a followee device and transmitting the message to a follower device after determining characteristics or states of the followee device or characteristics and states of a user.

According to an aspect of the present invention, there is provided a method of connecting devices, the method comprising: receiving from a first device a request to follow a second device; and setting a following relationship between the first device and the second device in response to the request.

The method of connecting devices can further comprise receiving information related to the second device from the second device; and transmitting the received information related to the second device to the first device.

The method of connecting devices can further comprise receiving the information related to the second device from the second device; processing the received information related to the second device; and transmitting the processed information to the first device.

The processing of the information related to the second device can comprise processing the received information related to the second device based on the received information related to the second device and external information transmitted from a third device.

The processing of the information related to the second device can comprise processing the received information related to the second device based on the received information related to the second device and previously stored information related to the second device.

The processing of the information related to the second device can comprise receiving information related to the first device from the first device; and processing the received information related to the second device based on the received information related to the second device and the received information related to the first device.

The information received related to the second device can be formed as a structured message in a machine readable language.

The processed information can be formed as a structured message in a machine readable language.

The structured message can be formed in one of Javascript® object notation (JSON), eXtensible markup language (XML), resource description framework (RDF), or Web ontology language (OWL).

The setting of the following relationship between the first device and the second device in response to the request can comprise transmitting the request to the second device; receiving an approval response to the request from the second device; and setting the following relationship between the first device and the second device when the approval response is received.

According to another aspect of the present invention, there is provided an apparatus for connecting devices, the apparatus comprising: a communication unit that receives from a first device a request to follow a second device; and a control unit that sets a following relationship between the first device and the second device in response to the request.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present invention will be described with reference to accompanying drawings.

Figure 1:
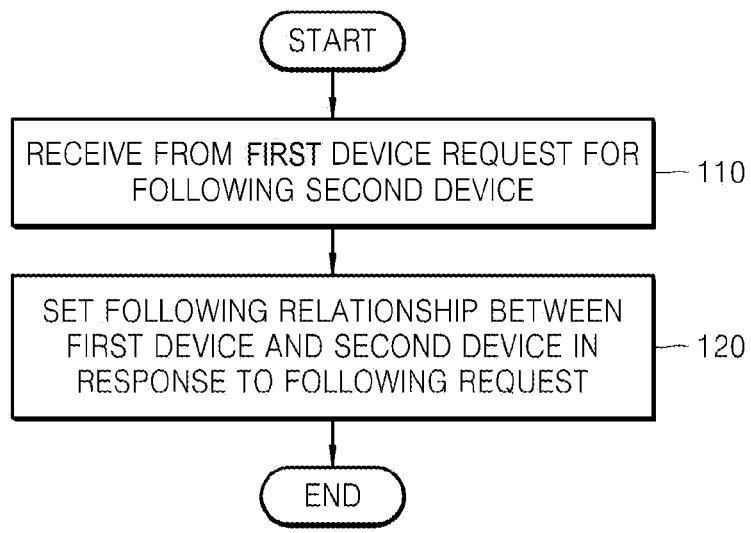
FIG. 1 illustrates a method of connecting devices according to an embodiment of the present invention.

FIG. 1 illustrates a method of connecting devices according to an embodiment of the present invention.

Referring to FIG. 1, in operation S110, an apparatus connecting devices receives, from a first device, a request to follow a second device. That is, the first device is a follower, and the second device is a followee. In the present embodiment, following means following between devices, not between users.

In operation S120, the apparatus connecting devices sets the following relationship between the first device, that is, the follower, and the second device, that is, the followee, in response to the request. When the following relationship is set, the apparatus connecting devices receives predetermined information from the second device, that is, the followee, and transmits the received information or information obtained by processing the received information to the first device, that is, the follower. The second device, that is, the followee, does not need to receive information about the first device. That is, even when the apparatus connecting devices receives predetermined information from the first device, it does not transmit the information to the second device. After setting the following relationship, the apparatus connecting devices manages the following relationship.

The apparatus connecting devices can set the following relationship between the first device and the second device by itself without requesting the second device to approve the following. Otherwise, the apparatus connecting devices can set the following relationship between the first and second devices, when the apparatus connecting devices transmits the request to the second device and receives an approval response from the second device.

Figure 2:
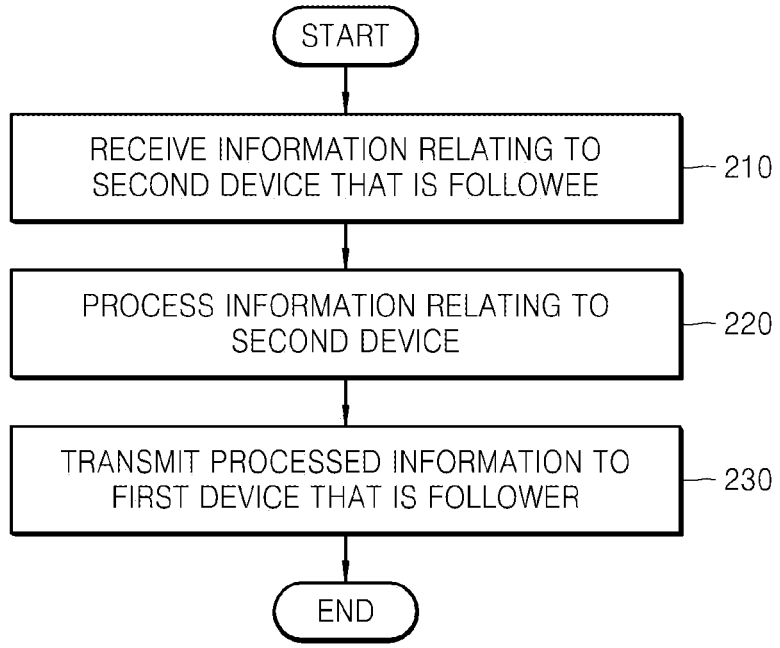
FIG. 2 illustrates a method of connecting devices after a following relationship between the devices is set according to an embodiment of the present invention.

FIG. 2 illustrates a method of connecting devices after a following relationship is set according to an embodiment of the present invention.

Referring to FIG. 2, in operation S210, the apparatus connecting devices receives information about the second device from the second device, that is, the followee. The second device collects state information in the second device, or event information or a log that occurred due to an operation of the device or external information. The information related to the second device refers to event information collectable by the second device, for example, device specification information, device state information, device sensing information, device operation information, user event information, user information in the device, or device usage information. The device specification information is information such as a device identification (ID), a device type, a device name, or a device production date, that is, the information determined when fabricating or selling the device. The device state information is information obtained from a device system, for example, setting information of the device, a central processing unit (CPU) usage amount, or a CPU usage time. The device sensing information is information obtained from a sensor formed in the device, for example, location information such as global positioning system (GPS) coordinates or an external temperature. The device operation information is information representing a current operation of the device. The user event information is information representing that the device reaches a certain operation or state of the device designated by the user. The user information in the device is user information such as a user ID or a personal information management system (PIMS). The device usage information is history information representing the usage of a certain function by the user. However, the above information is merely exemplary, and the present invention is not limited thereto. After that, the second device generates a transmittable message by using the collected event information. More particularly, the second device converts a format of the collected event information to structured machine readable language that is comprehensible to the device. In the present specification, a structured message comprehensible to the device is referred to as a device message. In the present embodiment, the structured message type that is comprehensible by the device is one of JavaScript® Object Notation (JSON), eXtensible MarkUp Language (XML), Resource Description Framework (RDF), or Web Ontology Language (OWL). Thereafter, the second device transmits the generated message to the apparatus connecting devices.

In operation S220, the apparatus connecting devices processes the information related to the second device. In advance, the apparatus connecting devices has analyzed the received message, has stored the information related to the second device, and has managed the messages after searching for the messages in the information related to the second device or generating statistical information. Thereafter, when the apparatus connecting devices receives the information related to the second device, the apparatus connecting devices combines the previous information related to the second device, which is stored and managed by the apparatus connecting devices, and the newly received information related to the second device to process the combined information as the information to be transmitted to the first device. In addition, as another example, the apparatus connecting devices can receive external information from an external third device (third party), and then, combines the received information and the information related to the second device to process the combined information as the information to be transmitted to the first device. As another example, the apparatus connecting devices can receive the information related to the first device from the first device, and then, can combine the received information and the information related to the second device to process the combined information as the information to be transmitted to the first device.

In operation S230, the apparatus connecting devices converts the processed information to a structured machine readable language, and transmits the information to the first device. As another example, the apparatus connecting devices can transmit the message transmitted from the second device to the first device without processing the message.

Figure 3:
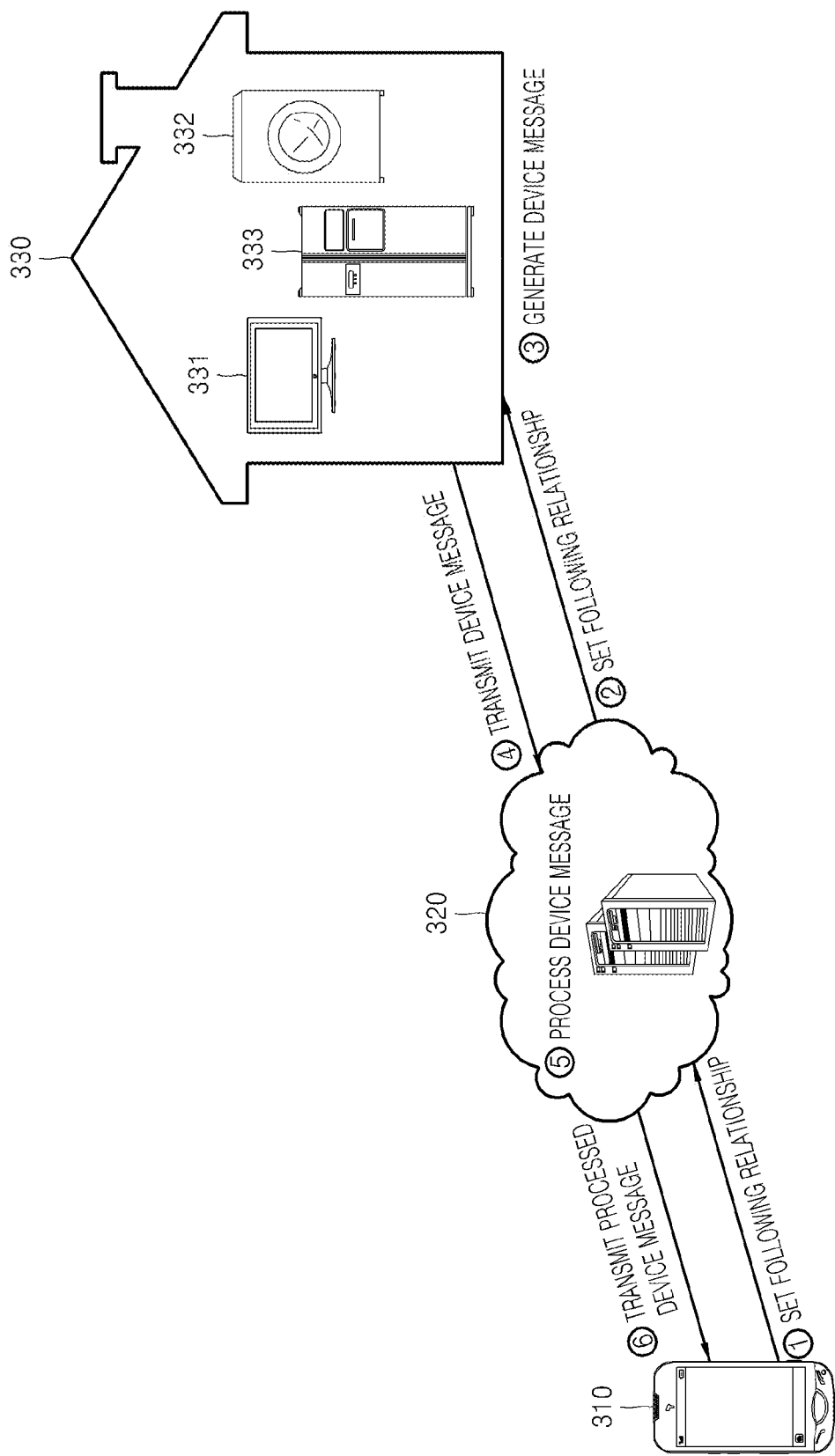
FIGS. 3 through 5 illustrate examples of a method of connecting devices according to an embodiment of the present invention.
Figure 4:
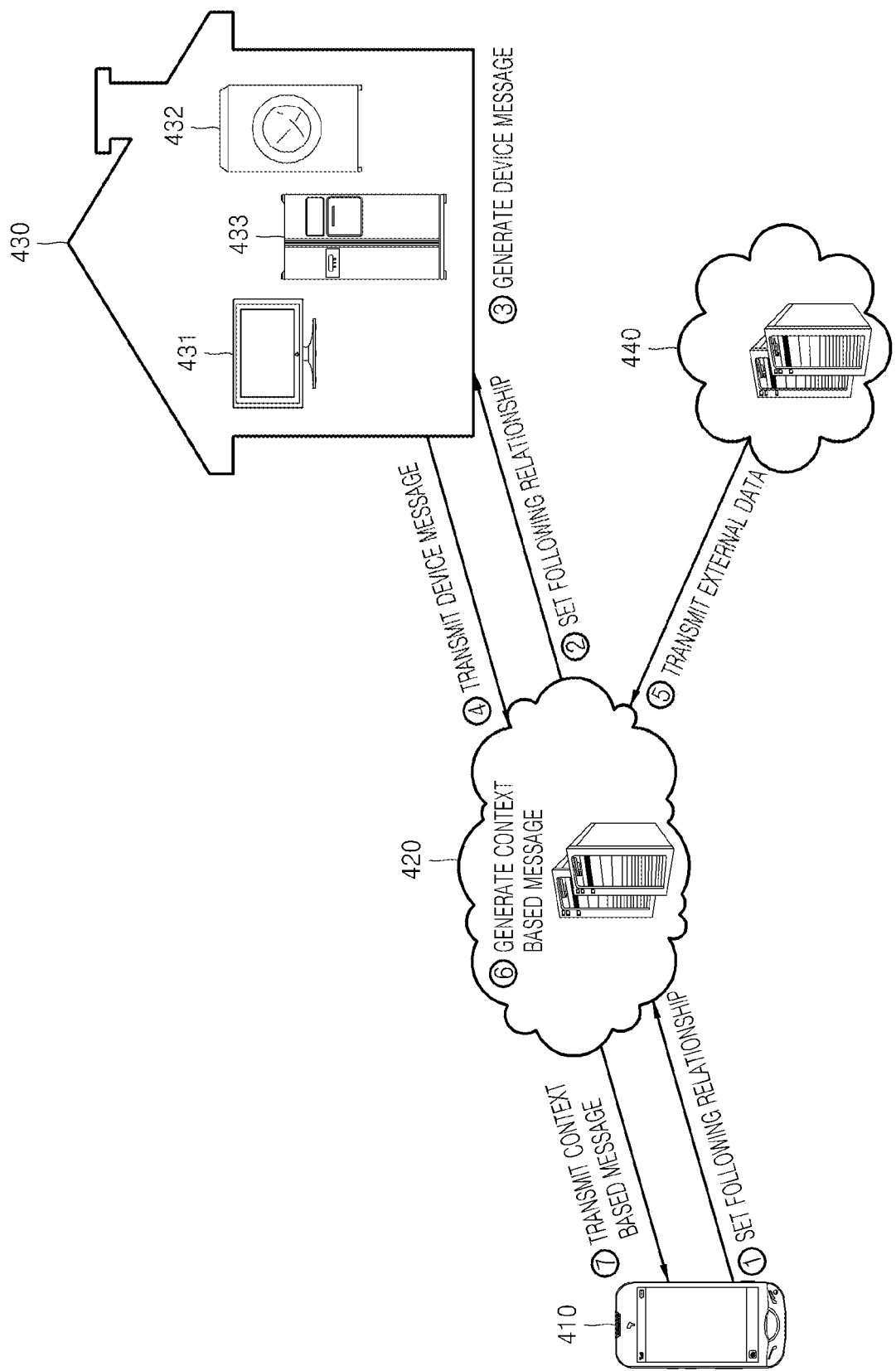
Figure 5:
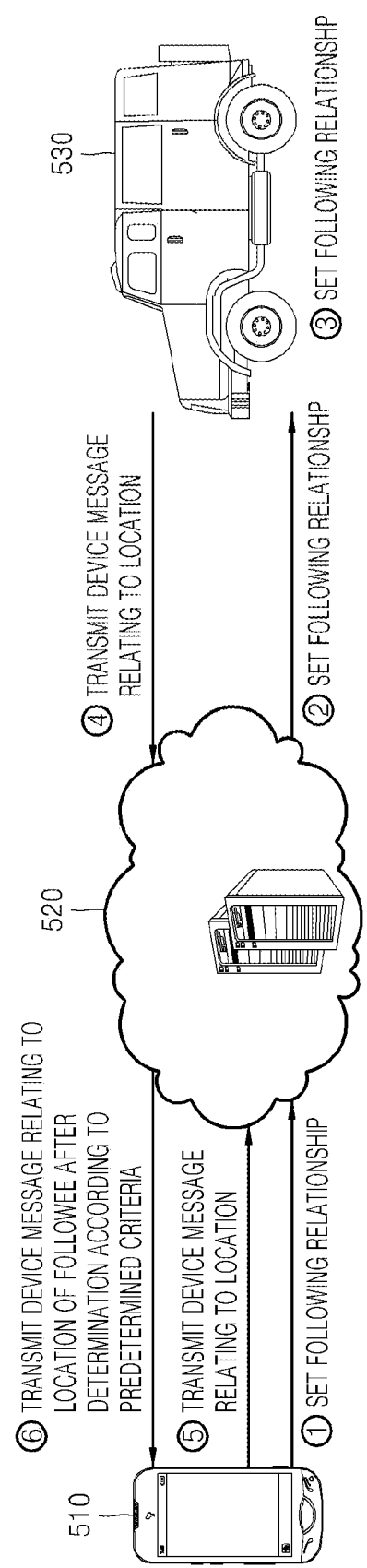

FIGS. 3 through 5 illustrate examples of a method of connecting devices according to an embodiment of the present invention.

Referring to FIG. 3, a mobile device 310 that is a first device and a follower transmits a request to follow at least one of electronic devices 331, 332, and 333 in a house 330, which is a second device, to a server 320 that is an apparatus connecting devices. Thereafter, the server 320 sets a following relationship between the mobile device 310 and the at least one of the electronic devices 331, 332, and 333. The at least one of electronic devices 331, 332, and 333, that is, the followee, generates a device message that is a structured message to be comprehensible to the device, when an event occurs. For example, an event, that is, opening of a door of the refrigerator 333 that is the followee, occurs, the refrigerator 333 generates the device message of the event, and transmits the device message to the server 320. Otherwise, the electronic device 331, 332, or 333 can generate the device message about event information related to a power consumption state of the electronic device 331, 332, or 333 such as smart metering, and transmit the device message to the server 320. The server 320 analyses the transmitted device message in order to process and transmit the device message to the mobile device 310, or transmits the transmitted device message to the mobile device 310. In this case, a personal mobile phone or a manufacturer terminal can be registered as a follower of the electronic devices in the house so as to monitor or remotely diagnose the states of the electronic devices, or to sense consumed power, thereby managing power consumption of the electronic devices.

Referring to FIG. 4, a mobile device 410 that is a first device and a follower transmits a request to follow at least one of electronic devices 431, 432, and 433 in a house 430, which is a second device, to a server 420 that is an apparatus connecting devices. Thereafter, the server 420 sets a following relationship between the mobile device 410 and the at least one of the electronic devices 431, 432, and 433. The at least one of electronic devices 431, 432, and 433, that is, the followee, generates a device message that is a structured message to be comprehensible to the device and transmits the device message to the server 420, when an event occurs. In addition, the server 420 receives external data from an external server 440, for example, a third party. For example, the server 420 can receive weather data from a server of a meteorological service provider. Thereafter, the server 420 generates a context-based message based on the device message and the external data. For example, when the server 420 receives a device message notifying about completion of a washing operation from a washing machine 432 and receives data about weather (for example, clear) from the external server 440, that is, the server of meteorological service provider, the server 420 can process the device message as a context message notifying that the laundry washing is complete and can be dried outdoors because the weather is clear. Thereafter, the server 420 transmits the processed context message to the mobile device 410. The server 420 analyses the device message information generated in the electronic devices and information of an accessible website or other devices, and generates the context-based message and provides a user with the context-based message that is specified for the user or demands the user to act.

Referring to FIG. 5, a mobile device 510 that is a first device and a follower transmits a request to follow a vehicle 530 that is a second device, to a server 520 that is an apparatus connecting devices. Thereafter, the server 520 sets a following relationship between the mobile device 510 and the vehicle 530. The vehicle 530, that is, the followee, generates a device message that is structured message to be comprehensible to the device, about an event and transmits the device message to the server 520, when the event occurs. For example, the vehicle 530 can generate a device message related to its current location and transmit the device message to the server 520. The mobile device 510 can generate a device message related to its current location, and transmit the device message to the server 520. The server 520 performs a determination operation based on the device messages related to the locations according to predetermined criteria, and transmits a message related to the location of the vehicle 530 that is the followee to the mobile device 510. For example, the server 520 can analyze the device messages to analyze a distance between the mobile device 510 and the vehicle 530, and transmit the device message related to the location of the vehicle 530 to the mobile device 510 when the mobile device 510 and the vehicle 530 are located within a predetermined range.

Figure 6:
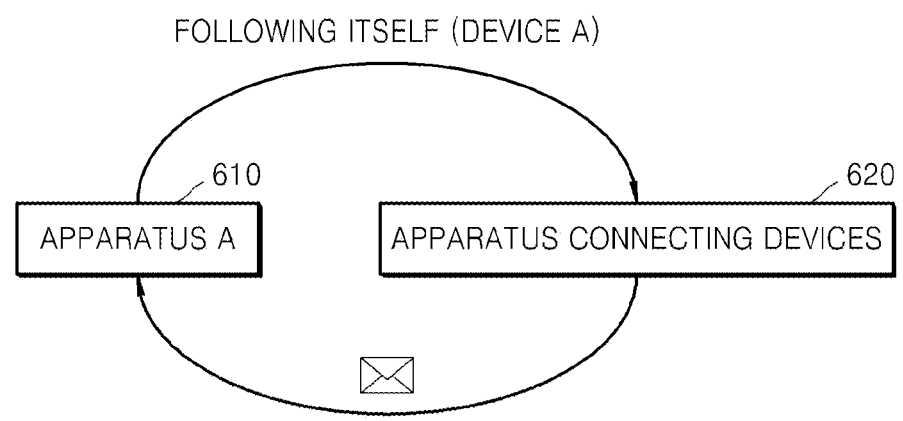
FIG. 6 illustrates a method of connecting devices according to another embodiment of the present invention.

FIG. 6 illustrates a method of connecting devices according to another embodiment of the present invention. Referring to FIG. 6, a device A 610 transmits a request to follow itself to an apparatus connecting devices 620. In this case, the device A 610 can have both standings of a follower and a followee at the same time. The device A 610 generates a device message and transmits the device message to the apparatus connecting devices 620, and the apparatus connecting devices 620 processes the device message transmitted from the device A 610 or generates a new device message based on the received device message to transmit the device message to the device A 610.

Figure 7:
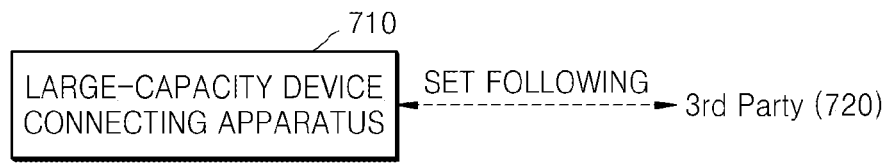
FIG. 7 illustrates a method of connecting devices, according to another embodiment of the present invention.

FIG. 7 illustrates a method of connecting devices according to another embodiment of the present invention.

Referring to FIG. 7, a large-capacity apparatus connecting devices 710 continuously receives device messages from devices, analyses the device messages, and stores the device messages in a large-capacity database. In this case, the large-capacity apparatus connecting devices 710 can provide device environments and services specified for various users from the large-capacity database based on the device messages that are analyzed and stored in the large-capacity database, and can extend to a circumstance recognition service. In addition, the large-capacity apparatus connecting devices 710 can provide a basic statistical reference such as characteristics of users and types of devices in use based on the large amount of device messages that are analyzed and stored in the large-capacity database, and further, can allow user-specified or subject-specified modeling for developing new businesses. In this case, the large-capacity apparatus connecting devices 710 analyses the large-capacity database and then transmits information to a third party 720.

Figure 8:
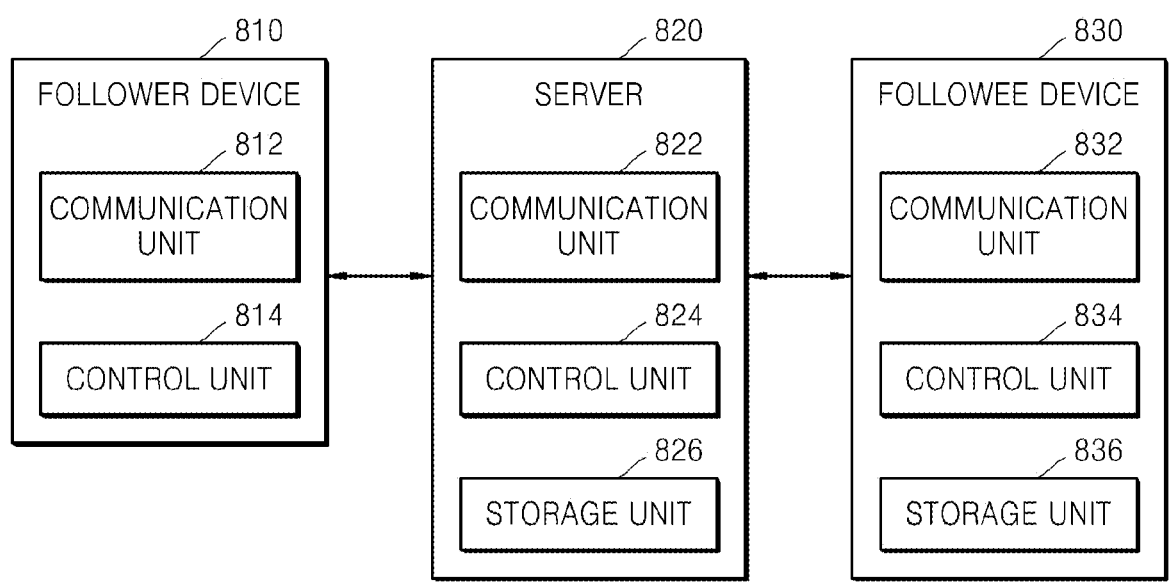
FIG. 8 illustrates an apparatus for connecting devices, according to an embodiment of the present invention.

FIG. 8 illustrates an apparatus connecting devices according to an embodiment of the present invention.

Referring to FIG. 8, a follower device 810 includes a communication unit 812 and a control unit 814. A server 820 that is the apparatus connecting devices includes a communication unit 822, a control unit 824, and a storage unit 826, and a followee device 830 includes a communication unit 832, a control unit 834, and a storage unit 836.

The control unit 814 of the follower device 810 transmits a request to follow the followee device 830 to the server 820 via the communication unit 812. In the present embodiment, the following relationship is set between the devices, not between users.

The control unit 824 of the server 820 sets a following relationship between the follower device 810 and the followee device 830 in response to the request. When the following relationship is set, the server 820 receives predetermined information from the followee device 830 and transmits the received information or information obtained by processing the received information to the follower device 810. The followee device 830 does not need to receive the information related to the follower device 810. That is, even when the server 820 receives the information from the follower device 810, the server 820 does not transmit the received information to the followee device 830. After the setting of the following relationship, the server 820 manages the following relationship.

The control unit 824 of the server 820 can set the following relationship between the follower device 810 and the followee device 830 by itself without transmitting a request to approve the request to follow to the followee device 830. Otherwise, the control unit 824 of the server 820 transmits the request to the followee device 830 via the communication unit 826, and then, the control unit 824 of the server 820 can set the following relationship between the follower device 810 and the followee device 830 on receiving an approval response to the request from the followee device 830.

The communication unit 822 of the server 820 receives information related to the followee device 830 from the followee device 830. The followee device 830 collects state information in the followee device 830, or event information or a log generated due to operations of the followee device 830 or external information. The information related to the followee device 830 is the event information that can be collected by the followee device 830, and can include device specification information, device state information, device sensing information, device operation information, user event information, user information in the device, or device usage information. The device specification information is information such as a device ID, a device type, a device name, or a device production date, that is, the information determined when fabricating or selling the device. The device state information is information obtained from a device system, for example, setting information of the device, a CPU usage amount, or a CPU usage time. The device sensing information is information obtained from a sensor formed in the device, for example, location information such as GPS coordinates or an external temperature. The device operation information is information representing a current operation of the device. The user event information is information representing that the device reaches a certain operation or state of the device designated by the user. The user information in the device is user information such as a user ID or a PIMS. The device usage information is history information representing the usage of a certain function by the user. However, the above information is merely exemplary, and the present invention is not limited thereto. The control unit 834 of the followee device 830 stores the information in the storage unit 836 to manage the information.

The control unit 834 of the followee device 830 generates a message that is transmittable by using the collected event information. More particularly, the control unit 834 of the followee device 830 converts the collected event information into a structured machine readable language format that is comprehensible to the device. In the present embodiment, a structured message type that is comprehensible to the device is one of JavaScript® Object Notation (JSON), eXtensible MarkUp Language (XML), Resource Description Framework (RDF), or Web Ontology Language (OWL). Thereafter, the communication unit 832 of the followee device 830 transmits the generated message to the server 820.

The control unit 824 of the server 820 processes the information related to the following device 830 transmitted from the followee device 830. The control unit 824 of the server 820 has analyzed the received message, has stored the information related to the followee device 830 in the storage unit 826, and has generated statistical information by using the information related to the followee device 830 and has managed the information. After that, when the communication unit 822 of the server 820 receives the information related to the followee device 830, the control unit 824 of the server 820 combines the previous information related to the followee device 830 which is stored and managed in the storage unit 826 and the newly received information related to the followee device 830 to process the combined information as the information to be transmitted to the follower device 810. Otherwise, as another example, the communication unit 822 of the server 820 can receive external information from a third device (third party), and the control unit 824 of the server 820 can combine the external information with the information related to the followee device 830 to process the combined information as the information to be transmitted to the follower device 810. As another example, the communication unit 824 of the server 820 can receive information related to the follower device 810 from the follower device 810, and then, can combine the received information related to the follower device 810 with the information related to the followee device 830 to process the combined information as the information to be transmitted to the follower device 810.

In addition, the server 820 continuously receives the devices message from the devices, and analyses the received device messages and stores the device messages in the storage unit 826. In this case, the server 820 can provide device environments and services specified for various users based on the device messages that are analyzed and stored in the storage unit 826, and can extend to a circumstance recognition service. In addition, the server 820 can provide a basic statistical reference such as characteristics of users and types of devices in use based on the device messages that are analyzed and stored in the storage unit 826, and further, can allow user-specified or subject-specified modeling for developing new businesses.

The control unit 824 of the server 820 converts the processed information into a structured machine readable language format, and then, transmits the information to the follower device 810 via the communication unit 822 of the server 820. As another example, the control unit 824 of the server 820 can transmit the message transmitted from the followee device 830 to the follower device 810 without processing the message.

According to another example of the present embodiment, the follower device 810 transmits a request to follow itself to the server 820. In this case, the follower device 810 can have both standings of a follower and a followee at the same time. The follower device 810 generates a device message and transmits the device message to the server 820, and the server 820 processes the device message transmitted from the follower device 810 or generates a new device message based on the received device message to transmit the device message to the follower device 810.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a context-based message, the method comprising:
receiving a request for a first device to be a follower of a second device from the first device;
transmitting the request to the second device;
receiving an approval response to the request from the second device;
based on the approval response, setting a following relationship of which the first device is the follower of the second device;
receiving a device information representing an action performed on the second device from the second device, wherein the action is identified according to a state of the second device or an operation of the second device;
receiving external context information from a third-party external server;
receiving information related to a current location of the first device, from the first device;
receiving information related to a current location of the second device, from the second device;
generating a context-based message for providing to the first device, based on the action comprised in the received device information, the received external context information, the received information related to the current location of the first device, and the received information related to the current location of the second device;
based on the following relationship, transmitting the context-based message to the first device;
receiving a second device message from the second device; and
transmitting the second device message to the first device without processing the second device message,
wherein the context-based message is a generated message for notifying a user action to be required based on the action identified according to the state of the second device or the operation of the second device.

2. A server comprising:
a transceiver; and
a processor configured to:
receive, via the transceiver, a request for a first device to be a follower of a second device from the first device,
transmit, via the transceiver, the request to the second device,
receive, via the transceiver, an approval response to the request from the second device,
based on the approval response, set a following relationship of which the first device is the follower of the second device,
receive, via the transceiver, device information representing an action performed on the second device from the second device, wherein the action is identified according to a state of the second device or an operation of the second device,
receive, via the transceiver, external context information from a third-party external server,
receive, via the transceiver, information related to a current location of the first device, from the first device,
receive, via the transceiver, information related to a current location of the second device, from the second device,
generate a context-based message for providing to the first device, based on the action comprised in the received device information, the received external context information, the received information related to the current location of the first device, and the received information related to the current location of the second device,
based on the following relationship, transmit, via the transceiver, the generated context-based message to the first device,
receive, via the transceiver, a second device message from the second device, and
transmit, via the transceiver, the second device message to the first device without processing the second device message,
wherein the context-based message is a generated message for notifying a user action to be required based on the action identified according to the state of the second device or the operation of the second device.

* * * * *